Patented Feb. 14, 1933

1,897,775

UNITED STATES PATENT OFFICE

SAMUEL TRANIN, OF KANSAS CITY, MISSOURI, ASSIGNOR TO TRANIN EGG PRODUCTS CO., A CORPORATION OF MISSOURI

EGG PRODUCT

No Drawing. Application filed April 22, 1929. Serial No. 357,346.

My invention relates to egg products and more particularly to articles of commerce comprising mixtures of eggs with other food substances, and processes for preparing the same, the principal object of the invention being to provide a product including natural egg and a fat combined in suitable proportions to provide a compound ingredient for use in the preparation of foods, to render such a product homogeneous and to facilitate and promote thorough distribution of the constituents among the other ingredients of the food.

In the manufacture of ice cream, relatively expensive pure, sweet cream, and milk, are preferred ingredients, to produce a rich product having desired smooth texture, but the resulting ice cream tends to change quickly to liquid. Manufacturers add various ingredients to replace part or all of the pure cream, and to confer ability to stand up.

Common present practice is to use dried skim milk, dried egg yolk, and a relatively large proportion of whole or skim milk. Separately dried skim milk and egg yolk are sometimes mixed to form a commercial product for this use. When added to milk, the separate particles of dried milk and dried yolk act independently with the liquid milk, are with difficulty blended with the liquid, and fail to produce a homogeneous product having desired characters of high quality.

Particular objects of my invention therefore are to combine dried milk and egg yolk to form a homogeneous ingredient for foods, to include butter fat in the ingredient, and to provide an ingredient which will assure high quality for ice cream and enable the ice cream to stand up for a relatively long period when subjected to heat.

In accomplishing these and other objects of the invention, I have provided a new product not heretofore available, and a process for producing the product which will be particularly described.

In a specific aspect adapted to the preparation of a compound ingredient for icecream comprising eggs and milk, the process consists essentially in the mixing of a suitable amount of dried milk with a quantity of liquid egg yolk to form a homogeneous product, and conditioning the product for packaging for distribution to ice cream manufacturers.

A complete process for preparing a preferred product in accordance with my invention will be described, quantities being given to indicate preferred proportions of constituents.

To prepare 100 pounds of a product, I provide 60 pounds of egg yolk in liquid form and unbeaten condition, 15 pounds of liquid butter fat, and 25 pounds of dried milk, preferably sweet buttermilk. These three ingredients are mingled with relatively little stirring or agitation to avoid beating up the yolk, and a homogeneous solution results.

I preferably add the dried milk to the egg yolk, for dissolving the milk in the yolk, and may add the fat immediately after introducing the milk to the yolk, in order to bring about the simultaneous association of the yolk, milk and fat, and the complete and equal dispersion and distribution of the milk and fat through the relatively large body of yolk. The dried milk soaks up the liquid egg and fat, and an emulsion-like mixture results, which retains its new character.

The product is then dried, and because of the thorough dispersion of the milk and fat in the egg, substantially all particles of the dried product consist of yolk, fat and milk.

The dried product is in a particularly favorable condition, due to its homogeneous character, for use in the manufacture of icecream and similar foods. The high degree of dispersion of the milk and fat in the egg promotes the distribution of the three constituents in the body comprising the other ingredients of the ice cream, so that the homogeneous character of the resulting ice cream is assured.

Each particle will be brought into contact with the relatively large proportion of liquid milk forming the bulk of the ice cream stock, and all the yolk, dried milk and fat will therefore be equally distributed through the liquid milk, and act equally on all portions of the ice cream mixture.

The constituents of the primary mixture do not tend to act on each other in the ice cream mixture, and combine with the liquid milk rather than with each other.

The dried milk adds beating and whipping qualities to the ice cream mixture, the fat and egg yolk confer stiffness on the ice cream when frozen, and also add richness, the fat particularly contributing richness.

Ice cream including my new article comprising skim milk, fat and egg yolk, will have a high quality of texture, will be smooth, and will resist melting, and will be homogeneous.

A relatively small amount of my product may be added to a large quantity of milk for making ice cream, for example sufficient to comprise 1½ per cent of the ice cream mixture, and the resulting ice cream will have a larger volume, greater smoothness, more richness, and better keeping qualities than ice cream containing the same ingredients in the same proportions prepared by ordinary methods, and will be less expensive and stand up better than when pure cream is used.

My process is particularly useful and the product will be particularly desirable since a compound article is formed including the egg, milk, and butter fat constituents of a food in suitable proportions to each other, and in easily usable form and can be mixed with other ingredients of a food with assurance that the egg, milk and the butter fat will be thoroughly distributed among the other ingredients.

A particular form of the product may be prepared having the egg and fat constituents in any desired proportions. The fat will be in a condition in the egg similar to the condition of butter fat in milk, the high degree of dispersion of the fat being particularly desirable in the manufacture of ice cream and similar foods.

What I claim and desire to secure by Letters Patent is:

1. The process of preparing an egg product including stirring dried milk with a quantity of liquid egg yolk sufficient to provide the moisture for dissolving the milk, and limiting the stirring step to avoid beating up of the egg yolk.

2. The process of preparing an egg product including adding a quantity of dried milk to a quantity of liquid egg yolk in unbeaten condition sufficient to dissolve the milk, agitating the milk and egg yolk to promote mixture thereof for dissolving the milk in the yolk, limiting the agitating step to avoid beating up the yolk, and drying the mixture containing unbeaten egg yolk to provide a product which may be beaten up.

3. The process of preparing an egg product including adding a sufficient quantity of dried milk to a body of liquid egg yolk to dissolve in the yolk and form a homogeneous mixture, stirring the mixture to promote dispersion of the particles of dried milk throughout the body of liquid egg yolk, limiting the stirring step to avoid beating up the egg yolk, and drying the mixture to provide an egg yolk product capable of being beaten up when mixed with liquid.

4. The process of preparing an egg product comprising adding a sufficient quantity of liquid egg to a body of dried milk to dissolve substantially all of the milk, adding liquid fat to the milk and egg yolk, limiting the added fat to an amount sufficient to combine with the milk and egg yolk for forming a homogeneous mixture, stirring the milk, egg yolk and fat to disperse the milk and fat through the egg yolk, and limiting the liquid content of the product to the egg yolk and fat.

5. An egg product including egg yolk and dried milk dissolved in the egg yolk in substantially the proportions of 60 pounds of egg yolk in liquid form to 25 pounds of dried milk.

6. An egg product capable of being beaten up comprising in substantially the proportions named 60 percent by weight of egg yolk, 25 per cent of dried milk dissolved in the egg yolk, and 15 per cent of fat combined with the egg yolk and milk.

In testimony whereof I affix my signature.

SAMUEL TRANIN.